United States Patent [19]
Persson et al.

[11] Patent Number: 5,328,378
[45] Date of Patent: Jul. 12, 1994

[54] DEVICE FOR TRANSFERRING A SIGNAL BETWEEN TWO END POINTS WHICH ARE MOVABLE RELATIVE TO EACH OTHER

[75] Inventors: Dan Persson, Alingsas, Sweden; Friedrich Schauer, Heroldsberg, Fed. Rep. of Germany; Wolfgang Chille, Oberasbach, Fed. Rep. of Germany; Andreas Neuner, Nürnberg, Fed. Rep. of Germany

[73] Assignees: kabelmetal electro GmbH, Hanover, Fed. Rep. of Germany; Autoliv Development AB, Vägärda, Sweden

[21] Appl. No.: 39,950

[22] Filed: Mar. 29, 1993

[51] Int. Cl.5 ............................................. H01R 39/02
[52] U.S. Cl. ....................................... 439/164; 439/15
[58] Field of Search ................................. 439/15, 164

[56] References Cited
U.S. PATENT DOCUMENTS 4,630,501 12/1986 Kubota et al. ................ 439/15 X
4,722,690 2/1988 Priede ................................ 439/15
5,205,754 4/1993 Kuramoto ..................... 439/15 X
5,257,943 11/1993 Ueno et al. .................. 439/15 X Primary Examiner—Eugene F. Desmond
Attorney, Agent, or Firm—Martin A. Farber

[57] ABSTRACT

A device for transferring a signal between two end points between which a coiled conductor, contained in a substantially circular cassette, is arranged. At least one of the two end points is movable relative to the other. The cassette consists of two parts, a stationary stator (11) and a turnable rotor (12). On the stator (11) there is arranged a holding element which is under spring force and has a free end which is fixed in the assembled position of the cassette in tensioned state on the rotor (12). The holding element is detachable from the rotor (12) by rotation of the latter, so that, in the operating position of the cassette, it protrudes, in released position, through a space of the cassette, separated from the latter.

12 Claims, 3 Drawing Sheets

DEVICE FOR TRANSFERRING A SIGNAL BETWEEN TWO END POINTS WHICH ARE MOVABLE RELATIVE TO EACH OTHER

FIELD AND BACKGROUND OF THE INVENTION

The present invention relates to a device for transferring a signal between two end points between which a coiled conductor is disposed, the conductor being contained in a substantially circular cassette, to which conductor further extending conductors can be attached at the two end points, and wherein the length of the conductor is substantially greater than the distance between the two points, at least one of the two end points being movable relative to the other, and wherein the cassette consists of two parts including a stationary stator and a turnable rotor.

Such a device is described in European patent document EP-OS 0 417 350.

Such a device is needed, for instance, for transmitting a signal for releasing the collision protection "air bag" of motor vehicles. It is arranged in the steering wheel of a motor vehicle for transmission of an electrical or optical signal "Conductor," as used in the invention, can therefore be an electrical conductor or an optical conductor. A problem arises in the use of this device for the transmission of a signal between stationary and moving parts of the motor vehicle. The wiper contacts or rings known for a long time for the transmission of current for such cases are subject to wear and are disadvantageous, particularly in the case of low-current intensities, due to the varying contact resistances.

In the known device according to the aforementioned EP-OS 0 417 350, electrical current is used for the transmission of the signal. The transmission of the signal is effected by a ribbon conductor coiled, for instance, in the manner of a spring housing. Upon relative rotation of the two end points connected by the ribbon conductor, the coiled ribbon conductor "breathes" like the spring of a watch. The turns of the coiled ribbon conductor are contracted to a smaller diameter in one direction of rotation. In the opposite direction of rotation, they return to a larger diameter.

It is therefore important, in the installing of this device in the steering wheel of a motor vehicle, that the two end points have a very specific position with respect to each other, with a corresponding position of the ribbon conductor, so that the predetermined number of revolutions of the rotor are possible in both directions of rotation of the steering wheel without the ribbon conductor being torn off from the end points or otherwise damaged.

SUMMARY OF THE INVENTION

It is an object of the invention so to develop the aforementioned device so that the requisite relative positions of the end points can be retained during installation of the device in simple manner.

According to the invention:
to one part of the cassette (K), a holding element is fastened under spring force and so acts, in the assembled position of the cassette (K), on a second part thereof that the two parts are fixed in a predetermined position relative to each other; and the holding element can be loosened by a rotation of the rotor (12) so that, in the operating position of the cassette, it is separated by a space from the part provided with a holder engaged with the holding element.

In this device, rotor and stator of the cassette are fixed by the holding element, in the operating position of the cassette, and in the position which is predetermined for the installing in the steering wheel of a motor vehicle. This position is retained until the rotor is turned. By such a sufficiently strong rotation, the holding element is detached and brought into a position which is separated by a space from the other part of the cassette. The holding element can therefore not wipe against the rotor in its open position. Wiping noises can therefore not occur.

According to another feature of the invention, the holding element is a clamp (14) which is under spring force and is fastened, in the assembled position of the cassette (K), in tensioned state with its free end on a holder present on the other part of the cassette (K), and the clamp (14) can be loosened from the holder by turning the rotor (12), so that, in the operating position of the cassette (K), the clamp protrudes, in relaxed condition, through a space of the cassette (K), separated from the latter.

Another feature of the invention is that the clamp (14) is fastened on the stator (11).

Still another feature is that the clamp (14) consists of spring material.

Also, according to other aspects of the invention, a holder for the clamp (14) is developed as a recess (15) the width of which corresponds approximately to the width of the clamp (14) at its free end and which, viewed in circumferential direction of the cassette (K), has a trapezoidal cross section with bevels (17, 18) arranged on both sides, the bevels extending from the bottom of the recess (15) up to its upper edge.

The invention also provides that on the free end of the clamp (14) which is intended to engage in the depression (15) there is a thickening (16) which is beveled on both sides in a manner corresponding to the bevels (17, 18) of the depression (15).

Another feature of the invention is that the clamp (14) is fastened on the circumferential surface of the stator (11).

Still the invention provides the feature that the holder for the clamp (14) is arranged on or in the outer end surface of the rotor (12).

According to another feature of the invention, a bevel (20) is provided on the edge of the rotor (12) in the region of the holder, the bevel rising, beginning at the edge of the rotor (12), with decreasing diameter towards the surface of the rotor (12).

Yet further, the invention provides that the holding element is a spring (21) having two stable positions, which spring, in the assembled position of the cassette (K), engages in its one stable position into a depression (22) in the other part thereof, and in the operating position of the cassette (K) lies in its other stable position in a depression (23) in the part of the cassette (K) to which it is fastened.

Also according to a feature of the invention, the spring (21) is fastened to the stator (11).

BRIEF DESCRIPTION OF THE DRAWINGS

With the above and other objects and advantages is view, the present invention will become more clearly understood in connection with the detailed description of preferred embodiments when considered with the accompanying drawings, of which.

DETAILED DESCRIPTION OF THE PREFERRED EMBODIMENTS

The invention will be described below for a cassette in which a ribbon conductor with electric wires is arranged. Instead of the ribbon conductor, there could, however, also be used a conductor having at least one photoconductor. A combined conductor with electrical and optical conductors could also be used.

Figure 1:
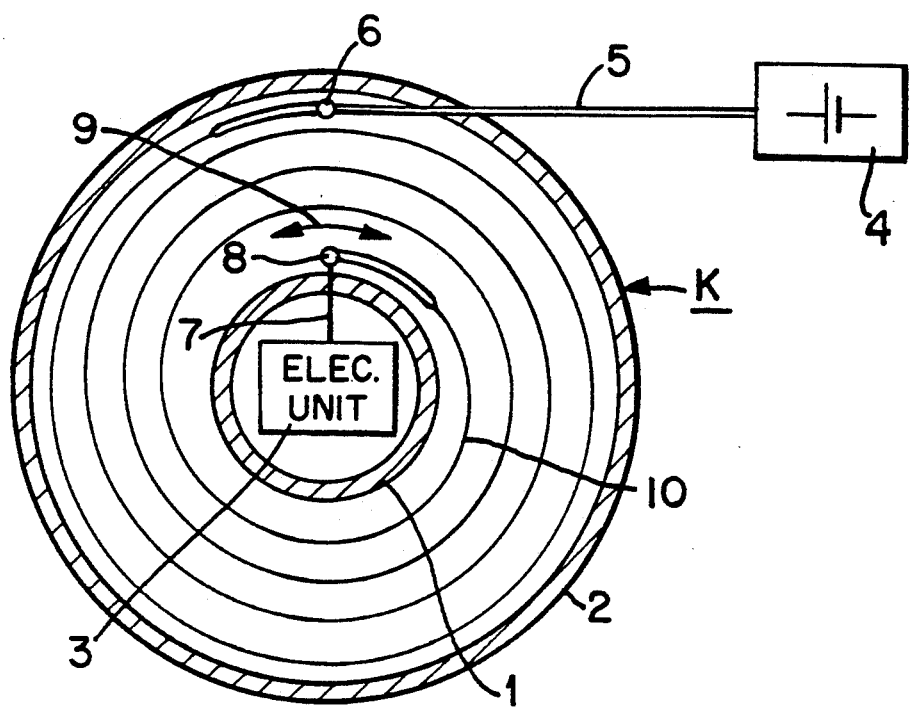
FIG. 1 shows diagrammatically a cross section through a cassette having a device in accordance with the invention.

FIG. 1 shows diagrammatically two walls 1 and 2 of a cassette K, the walls being, for instance, circular. It is intended for installation in the steering wheel of a motor vehicle. For the supplying of current to an electronic unit 3 by the signal of which an air bag can be released, the cassette K is connected to the battery 4 of the motor vehicle. The battery 4 is connected by an electric line 5 to an end point 6, developed as fixed point, of the cassette K. The electronic unit 3 is connected by an electric wire 7 to an end point 8 of the cassette K, which end point is movable in the directions shown by the double-ended arrow 9. In principle, the end point 8 could also be fixed and the end point 6 be made movable. Both end points 6 and 8 could also be movable.

Between the two end points 6 and 8 a ribbon conductor 10 containing at least two electric wires is arranged. The wires are preferably developed as flat wires. This embodiment of the ribbon conductor 10 is particularly thin and therefore takes up very little space. In principle, the ribbon conductor 10, however, could also have round wires. The construction of the ribbon conductor 10 and the nature of its connection to the end points 6 and 8 are not shown in detail. In principle, several variants thereof are known and are not of importance here.

The ribbon conductor 10 can, as shown in FIG. 1, be arranged in the cassette in several turns between the two end points 6 and 8, namely in the manner of a spring housing of clocks. Although the number of revolutions of a steering wheel is limited to about six, more than six windings are to be provided for the ribbon conductor 10. The turning movement of the end point 8 is then not substantially perceptible for an individual turn of the ribbon conductor 10. The diameter of the coil consisting of all turns of the ribbon conductor 10 is then merely made smaller or larger.

Figure 2:
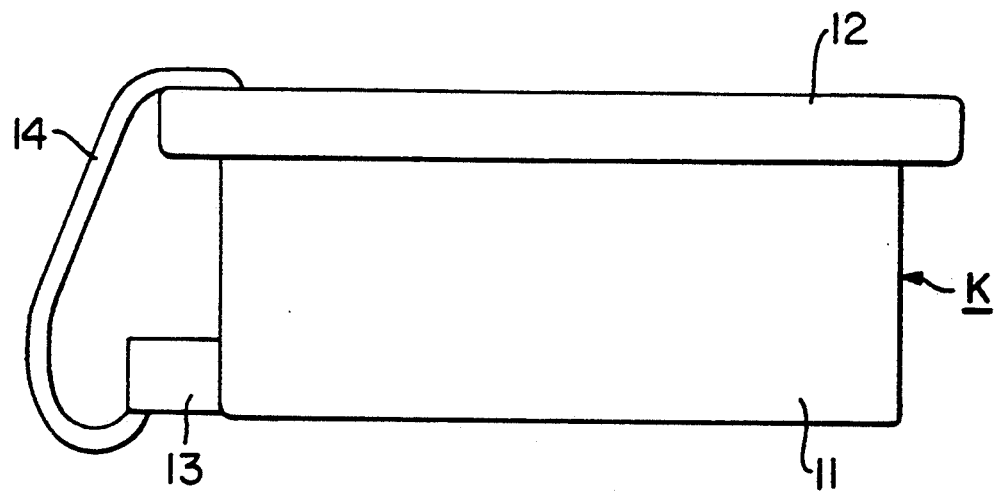
FIG. 2 is a plan view of a closed cassette.

The cassette K shown in FIG. 2 consists of a stator 11 and a rotor 12. The stator 11 can be firmly attached to the steering column of a motor vehicle, while the rotor 12 is turnable together with the steering wheel of the vehicle. The ribbon conductor 10 is disposed in the stator 11 approximately as shown in FIG. 1. The places where the ribbon conductor 10 or the ends thereof are brought out of the cassette K cannot be noted from FIG. 2.

In the embodiment shown, a clamp 14 which is under spring force is fastened on the circumferential surface of the stator 11 of the cassette K to a holder 13. For this purpose, the clamp 14 can itself consist of spring material. However, it is also possible to employ a spring which acts on it. In the operating position of the clamp 14 which is shown in FIG. 2, the clamp is also fastened to the rotor 12. The rotor 12 thus has a position with respect to the stator 11 which corresponds to the assembled position of the cassette K. It is thereby fixed with respect to the stator 11. This assembled position can also be fixed if the clamp 14 is fastened to the rotor 12 and has its free end fixed on the stator 11. It will then be turned with the rotor 12 in the "open position" upon the turning of the rotor. In the following, it will be assumed that the clamp 14 is fastened to the stator 11.

Figure 3:
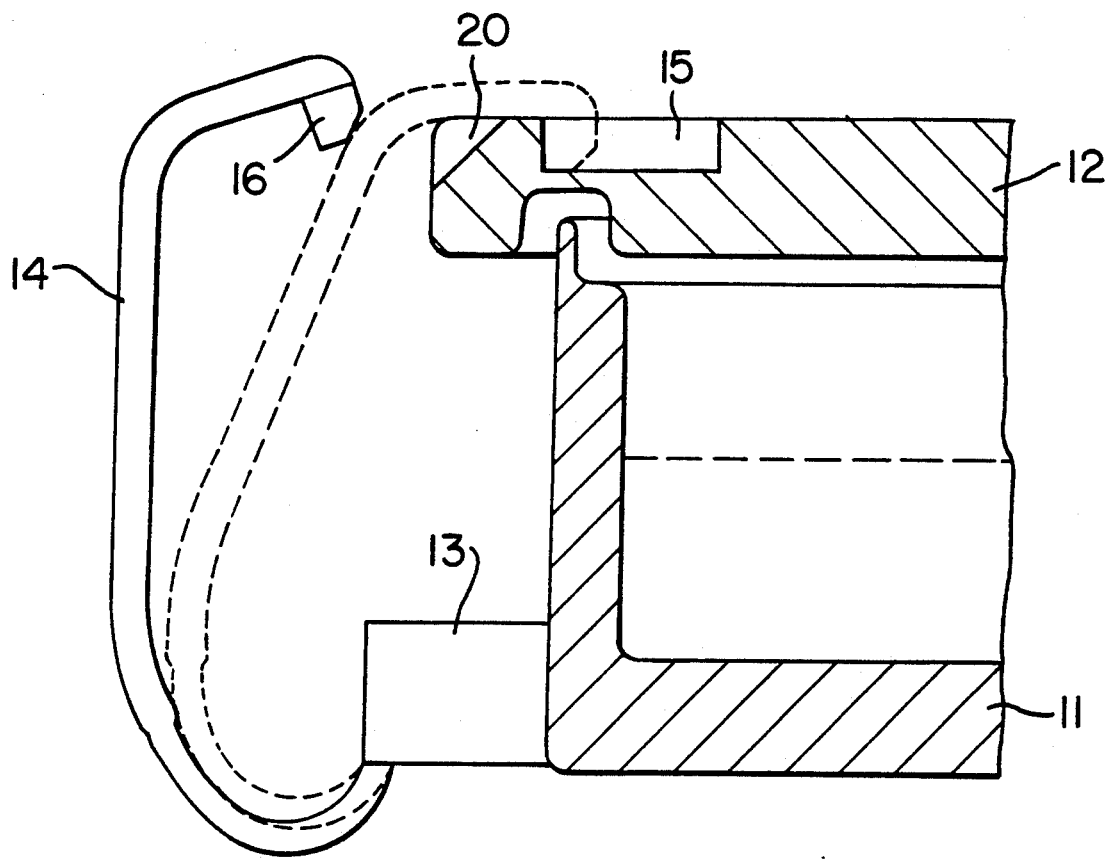
FIG. 3 is a section of the cassette of FIG. 2, shown on a larger scale in section.

The clamp 14 preferably consists of spring steel. However, it can also consist of a resilient plastic provided that there is assurance that this plastic will retain its resiliency for a long time. The clamp 14 is fastened on a holder of the rotor 12, the holder being so developed, in cooperation with the free end of the clamp 14, that upon a turning of the rotor 12 around the axis of the cassette K, the clamp is automatically detached from the holder and springs into its open position, which can be noted from the enlarged view in FIG. 3, so that the rotor 12 can then turn freely.

The clamp 14 can basically be held on the rotor 12 of the cassette K in any desired manner. It must be so developed that the clamp 14 is released from the rotor 12 by a turning movement of the latter. In the preferred embodiment, the holder consists of a depression 15 which is arranged in the outer end surface of the rotor 12. The width of the depression 15 corresponds to the width of the clamp 14 at its free end. By means of a thickening 16 arranged on its free end, the clamp 14 engages into the depression 15 so that, in tensioned condition, it is held in the position shown directly in FIG. 2 and in dashed line in FIG. 3.

Figure 4:
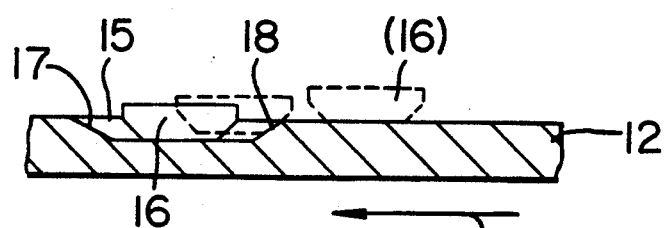
FIG. 4 is a detail of the cassette of FIG. 2, also shown on a larger scale.
Figure 5:
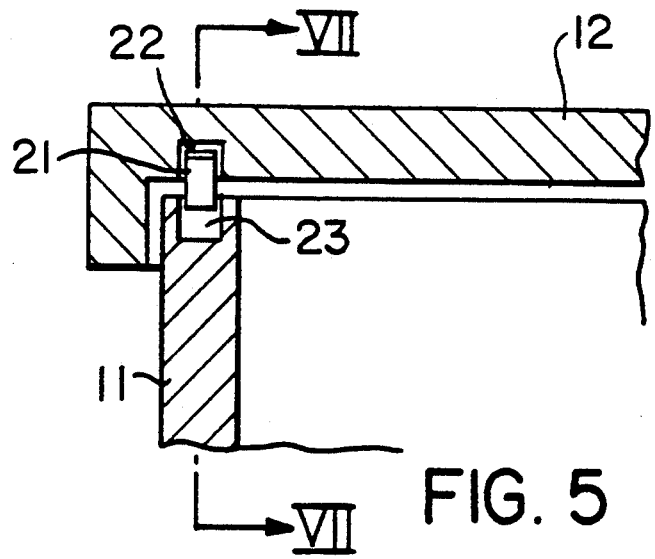
FIGS. 5 and 6 are two cross sections through a cassette having a different holding element than in FIGS. 2 to 4, shown in two different positions.

As shown in FIG. 4, the depression 15 in the preferred embodiment has a trapezoidal cross section seen in the circumferential direction of the cassette K. On its two sides lying in the circumferential direction of the rotor 12, it has bevels 17 and 18 which extend, rising from its bottom, up to its upper edge. The thickening 16 of the clamp 14, which is shown in FIG. 4, is beveled in a manner corresponding to the bevels 17 and 18. When the rotor 10 is turned for instance in the direction indicated by the arrow 19, the thickening 16 is brought by the cooperating bevels of the depression 15 on the one hand and of the thickening 16 on the other hand into the position, away from the depression 15, shown in dashed line in FIG. 4. The thickening 16 thereby is released from the depression 15 and the clamp 14 is no longer held on the rotor 12. Rather, it moves under spring action into its open position shown in FIG. 3. In this position, the clamp 14 is sufficiently far from the cassette K so that it cannot wipe on the rotor 12.

On the edge of the rotor 12, in the region of the depression 15, there can be arranged a bevel 20 as a result of which the clamp 14 can be snapped more easily on the rotor 12 in such a manner that it passes into the depression 15 or into another holder. The bevel 20 commences at the edge of the rotor 12 and increases with decreasing rotor diameter. The clamp 14 can thereby easily be brought again into the assembled position when the cassette K is removed for repair and is to be reinstalled again.

In accordance with the embodiment shown in FIGS. 5 to 8, the holding element can also be developed as spring 21, which is fastened in a depression 23 in the stator 11. The spring 21 has two stable positions. It engages in the one stable position, shown in FIGS. 5 and 7, into a depression 22 in the rotor 12. The stator 11 and rotor 12 are thereby fixed in a predetermined relative position with respect to each other.

Figure 6:
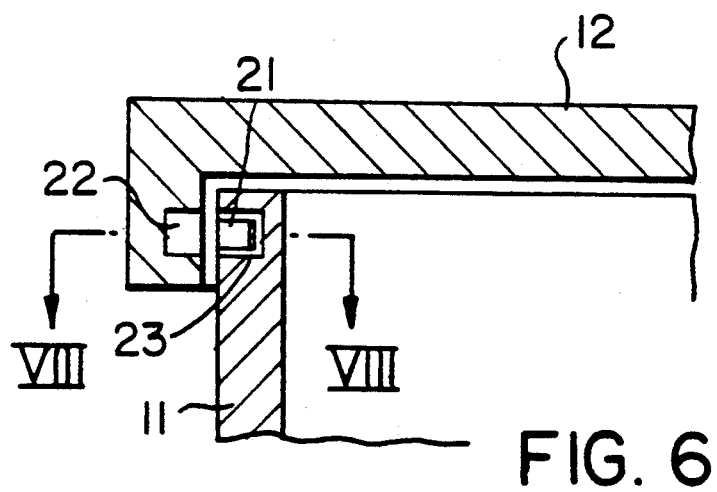
Figure 7:
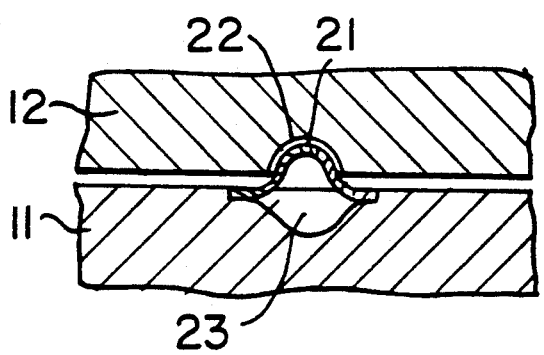
FIG. 7 is a section through FIG. 5 along the line VII—VII.
Figure 8:
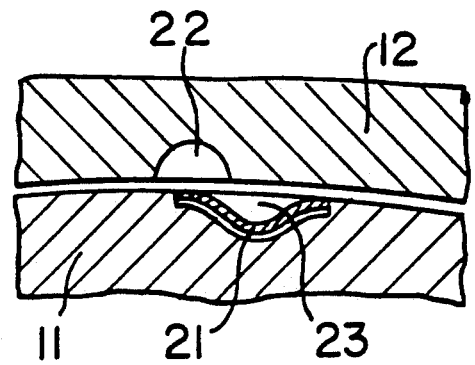
FIG. 8 is a section through FIG. 6 along the line VIII—VIII.

By a strong turning of the rotor 12, the spring 21 is snapped into its other stable position, shown in FIGS. 6 and 8. The spring 21 then lies completely in the depression 23 of the stator 11 so that the rotor 12 can be turned unimpeded and without wiping noises. In FIG. 8, it is shown turned somewhat as compared with the locked position.

The spring 21 could also be fastened on the rotor 12 and then engage into a depression in the stator 11 in the assembled position of the cassette K.

We claim:

1. A device for transferring a signal between two end points between which a coiled conductor is arranged, the device comprising:
   a substantially circular cassette enclosing said conductor, said end points permitting attachment of extending conductors at the two end points, the length of said conductor being substantially greater than the distance between said two points, and at least one of the two end points being movable relative to the other, the cassette comprising a stationary stator and a rotor rotatable relative to the stator;
   a holding element connected to a first part of said cassette, said holding element being activatable under spring force to act, in an assembled position of said cassette, on a second part of said cassette to hold the two parts fixed in a predetermined position relative to each other; and
   wherein said holding element can be loosened by a rotation of said rotor against said spring force so that, in an operating position of the cassette, said holding element is separated with clearance space from said second part of said cassette.

2. A device according to claim 1, wherein
said second part of said cassette has a holder;
said holding element is a clamp having a free end and providing the spring force, said holding element being fastened, in the assembled position of the cassette, in tensioned state with its free end on said holder of said second part of said cassette; and wherein
said clamp can be loosened from said holder by turning said rotor relative to said stator, so that, in an operating position of said cassette, said clamp protrudes, in relaxed condition, through a region of said cassette and separated from said cassette.

3. A device according to claim 1, wherein said first part of said cassette is said stator.

4. A device according to claim 2, wherein said first part of said cassette is said stator.

5. A device according to claim 4, wherein said clamp consists of spring material.

6. A device according to claim 2, wherein said holder in said second cassette part for said clamp is a depression having a width corresponding approximately to a width of said clamp at this free end and which, viewed in a circumferential direction of said cassette, has a trapezoidal cross section with bevels arranged on opposite sides of said depression, the bevels extending from a bottom of the depression up to its upper edge.

7. A device according to claim 6, wherein
said clamp has a thickening on the free end of said clamp for engagement in the depression, the thickening being beveled on opposite sides thereof in correspondence to the bevels of the depression.

8. A device according to claim 2, wherein
said clamp is fastened to a circumferential surface of said stator.

9. A device according to claim 2, wherein
said holder for said clamp is at an outer end surface of said rotor.

10. A device according to claim 9, wherein
a bevel is located on an edge of said rotor in a region of said holder, the bevel rising, beginning at the edge of the rotor, with decreasing diameter towards the surface of the rotor.

11. A device according to claim 1, wherein
said first part of said cassette has a first depression;
said second part of said cassette has a second depression; and
said holding element is a spring having two stable positions, which spring, in the assembled position of the cassette, engages in a second of the two stable positions, into said second depression in said second part and, in the operating position of said cassette, lies in a first of the two stable positions in said first depression in said first part of said cassette.

12. A device according to claim 11, wherein said first part of said cassette is said stator.

* * * * *

UNITED STATES PATENT AND TRADEMARK OFFICE
CERTIFICATE OF CORRECTION

PATENT NO. : 5,328,378
DATED : July 12, 1994
INVENTOR(S) : Dan Persson, et al

It is certified that error appears in the above-identified patent and that said Letters Patent is hereby corrected as shown below:

```
On the 1st cover page left-hand column line 14, after this
line insert:

--[30] Foreign Application Priority Data
March 30, 1992 [DE] Germany P 42 10 357.6--
```

Signed and Sealed this

Twelfth Day of December, 1995

Attest:

BRUCE LEHMAN

*Attesting Officer*    *Commissioner of Patents and Trademarks*